United States Patent
Park et al.

(10) Patent No.: US 9,401,794 B2
(45) Date of Patent: Jul. 26, 2016

(54) METHOD AND APPARATUS FOR ACQUIRING CONTROL INFORMATION IN WIRELESS COMMUNICATION SYSTEM

(71) Applicant: LG ELECTRONICS INC., Seoul (KR)

(72) Inventors: Kyujin Park, Anyang-si (KR); Hangyu Cho, Anyang-si (KR); Seunghee Han, Anyang-si (KR); Hyunsoo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 14/357,061

(22) PCT Filed: Nov. 7, 2012

(86) PCT No.: PCT/KR2012/009319
§ 371 (c)(1),
(2) Date: Jun. 13, 2014

(87) PCT Pub. No.: WO2013/069955
PCT Pub. Date: May 16, 2013

(65) Prior Publication Data

US 2014/0301343 A1      Oct. 9, 2014

Related U.S. Application Data

(60) Provisional application No. 61/556,834, filed on Nov. 8, 2011, provisional application No. 61/557,426, filed on Nov. 9, 2011.

(51) Int. Cl.
*H04W 4/00* (2009.01)
*H04L 5/00* (2006.01)

(52) U.S. Cl.
CPC ............ *H04L 5/0055* (2013.01); *H04L 5/0053* (2013.01)

(58) Field of Classification Search
CPC ........................... H04L 5/0055; H04L 5/0053
See application file for complete search history.

(56) References Cited

U.S. PATENT DOCUMENTS

| | | | |
|---|---|---|---|
| 2009/0274077 A1 | 11/2009 | Meylan et al. | |
| 2010/0232373 A1* | 9/2010 | Nory | H04W 72/1289 370/329 |
| 2011/0170496 A1* | 7/2011 | Fong | H04L 5/0053 370/329 |
| 2011/0249633 A1* | 10/2011 | Hong | H04L 5/0053 370/329 |
| 2012/0051306 A1* | 3/2012 | Chung | H04L 1/1893 370/329 |

(Continued)

FOREIGN PATENT DOCUMENTS

| | | |
|---|---|---|
| KR | 10-2009-0083269 A | 8/2009 |
| KR | 10-2011-0002880 A | 1/2011 |

(Continued)

*Primary Examiner* — Ayaz Sheikh
*Assistant Examiner* — Hai-Chang Hsiung
(74) *Attorney, Agent, or Firm* — Birch, Stewart, Kolasch & Birch, LLP

(57) ABSTRACT

A method for acquiring control information in a wireless communication system according to one embodiment of the present invention includes the steps of: receiving E-PDCCH (Enhanced-Physical Downlink Control Channel) configuration information from a base station (BS); and transmitting a confirmation response for the E-PDCCH configuration information. The terminal performs blind decoding for downlink control information in a common search space on a PDCCH (Physical Downlink Control Channel) resource region and a search space on the E-PDCCH during a predetermined period after transmitting the confirmation response.

12 Claims, 10 Drawing Sheets

(56) References Cited

U.S. PATENT DOCUMENTS

2013/0039291 A1* 2/2013 Blankenship .......... H04L 5/001
                                                    370/329
2013/0343311 A1   12/2013 Tee et al.

FOREIGN PATENT DOCUMENTS

| | | |
|---|---|---|
| KR | 10-2011-0084976 A | 7/2011 |
| KR | 10-2011-0112750 A | 10/2011 |
| WO | WO 2010/123257 A3 * | 10/2010 |

* cited by examiner

METHOD AND APPARATUS FOR ACQUIRING CONTROL INFORMATION IN WIRELESS COMMUNICATION SYSTEM

CROSS REFERENCE TO RELATED APPLICATIONS

This application is the National Phase of PCT/KR2012/009319 filed on Nov. 7, 2012, which claims priority under 35 U.S.C. §119(e) to U.S. Provisional Application No. 61/556,834 filed on Nov. 8, 2011, and U.S. Provisional Application No. 61/557,426 filed on Nov. 9, 2011, all of which are hereby expressly incorporated by reference into the present application.

TECHNICAL FIELD

The present invention relates to a method and apparatus for acquiring downlink control information (DCI) in a wireless communication system.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide a method and apparatus for transceiving control information, and more particularly to UE operations for acquiring downlink control information (DCI) when E-PDCCH is introduced.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for acquiring control information of a user equipment (UE) in a wireless communication system including: receiving Enhanced-Physical Downlink Control Channel (E-PDCCH) configuration information from a base station (BS); and transmitting an acknowledgement/negative acknowledgment (ACK/NACK) response to the E-PDCCH configuration information, wherein, during a predetermined time after transmission of the ACK/NACK response, the user equipment (UE) performs blind decoding for downlink control information (DCI) in a common search space of a physical downlink control channel (PDCCH) resource region and in a search space of an E-PDCCH resource region.

In a second technical aspect of the present invention, a method for transmitting control information of a base station (BS) in a wireless communication system includes: transmitting Enhanced-Physical Downlink Control Channel (E-PDCCH) configuration information; and receiving an ACK/NACK response to the E-PDCCH configuration information, wherein, during a predetermined time after reception of the ACK/NACK response, the base station (BS) transmits downlink control information (DCI) in a common search space of a physical downlink control channel (PDCCH) resource region and in a search space of an E-PDCCH resource region.

In a third technical aspect of the present invention, a method for acquiring control information of a user equipment (UE) in a wireless communication system includes: receiving Enhanced-Physical Downlink Control Channel (E-PDCCH) configuration information from a base station (BS); and transmitting an acknowledgement (ACK) response to the E-PDCCH configuration information, wherein, during a predetermined time after transmission of the ACK/NACK response, the user equipment (UE) performs blind decoding for downlink control information (DCI) in a common search space of a physical downlink control channel (PDCCH) resource region and in a search space of an E-PDCCH resource region.

In a fourth technical aspect of the present invention, a method for transmitting control information of a base station (BS) in a wireless communication system includes: transmitting Physical Downlink Control Channel (PDCCH) configuration information; and receiving an acknowledgement (ACK) response to the PDCCH configuration information, wherein, during a predetermined time after reception of the ACK/NACK response, the base station (BS) transmits downlink control information (DCI) in a common search space of an E-PDCCH resource region and in a search space of a PDCCH resource region.

The first to fourth technical aspects may include all or some parts of the following items.

The predetermined time may start from a next subframe of a subframe in which the ACK/NACK response is transmitted, and may be ended at a subframe in which a response to the received downlink control information (DCI) is transmitted, wherein the DCI is received through the search space of the E-PDCCH resource region.

The user equipment (UE) may perform blind decoding only in a UE-specific search space of the PDCCH resource region during a time period ranging from a reception time of the E-PDCCH configuration information to a transmission time of the ACK/NACK response.

The user equipment (UE) may perform blind decoding for downlink control information (DCI) only in a search space of the E-PDCCH resource region.

The search space of the E-PDCCH resource region may be any one of a common search space or a UE-specific search space.

The E-PDCCH configuration information may include specific information that informs the user equipment (UE) that downlink control information (DCI) will be transferred to the E-PDCCH resource region, after predetermined time duration.

The first to fourth technical aspects may include all or some parts of the following items.

The predetermined time may start from a next subframe of a subframe in which the ACK/NACK response is transmitted, and may be ended at a subframe in which a response to the received downlink control information (DCI) is transmitted, wherein the DCI is received through the search space of the PDCCH resource region.

The user equipment (UE) may perform blind decoding only in a UE-specific search space of the E-PDCCH resource region during a time period ranging from a reception time of the PDCCH configuration information to a transmission time of the ACK/NACK response.

The user equipment (UE) may perform blind decoding for downlink control information (DCI) only in a search space of the PDCCH resource region.

The search space of the PDCCH resource region may be any one of a common search space or a UE-specific search space.

The PDCCH configuration information may include specific information that informs the user equipment (UE) that downlink control information (DCI) will be transferred through the PDCCH resource region.

Advantageous Effects

As is apparent from the above description, the embodiments of the present invention can efficiently perform blind decoding according to a transmit (Tx) mode and/or downlink control format when E-PDCCH is introduced.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

Figure 1:
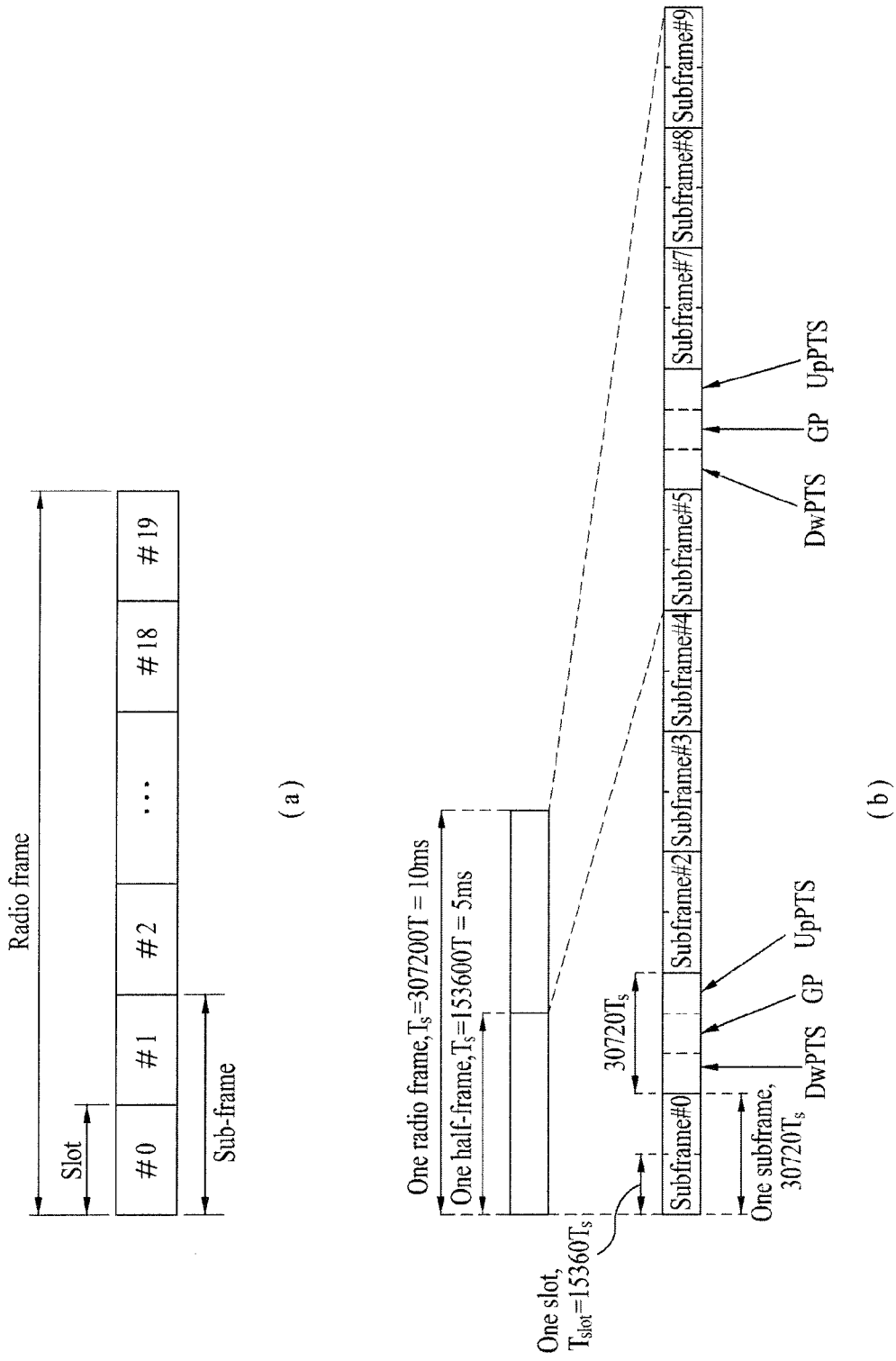
FIG. 1 exemplarily shows a downlink radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

FIG. 1 exemplarily shows a radio frame structure for use in the LTE system. Referring to FIG. 1(a), a radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in time domain. Since the LTE system uses OFDMA in downlink, the OFDM symbol indicates one symbol duration. One OFDM symbol may be called an SC-FDMA symbol or a symbol duration. An RB is a resource allocation unit and includes a plurality of contiguous subcarriers in one slot. The structure of the radio frame is only exemplary. Accordingly, the number of subframes included in one radio frame, the number of slots included in one subframe, or the number of OFDM symbols included in one slot may be changed in various manners.

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal.

The structure of the radio frame is only exemplary. Accordingly, the number of subframes included in the radio frame, the number of slots included in the subframe or the number of symbols included in the slot may be changed in various manners.

Figure 2:
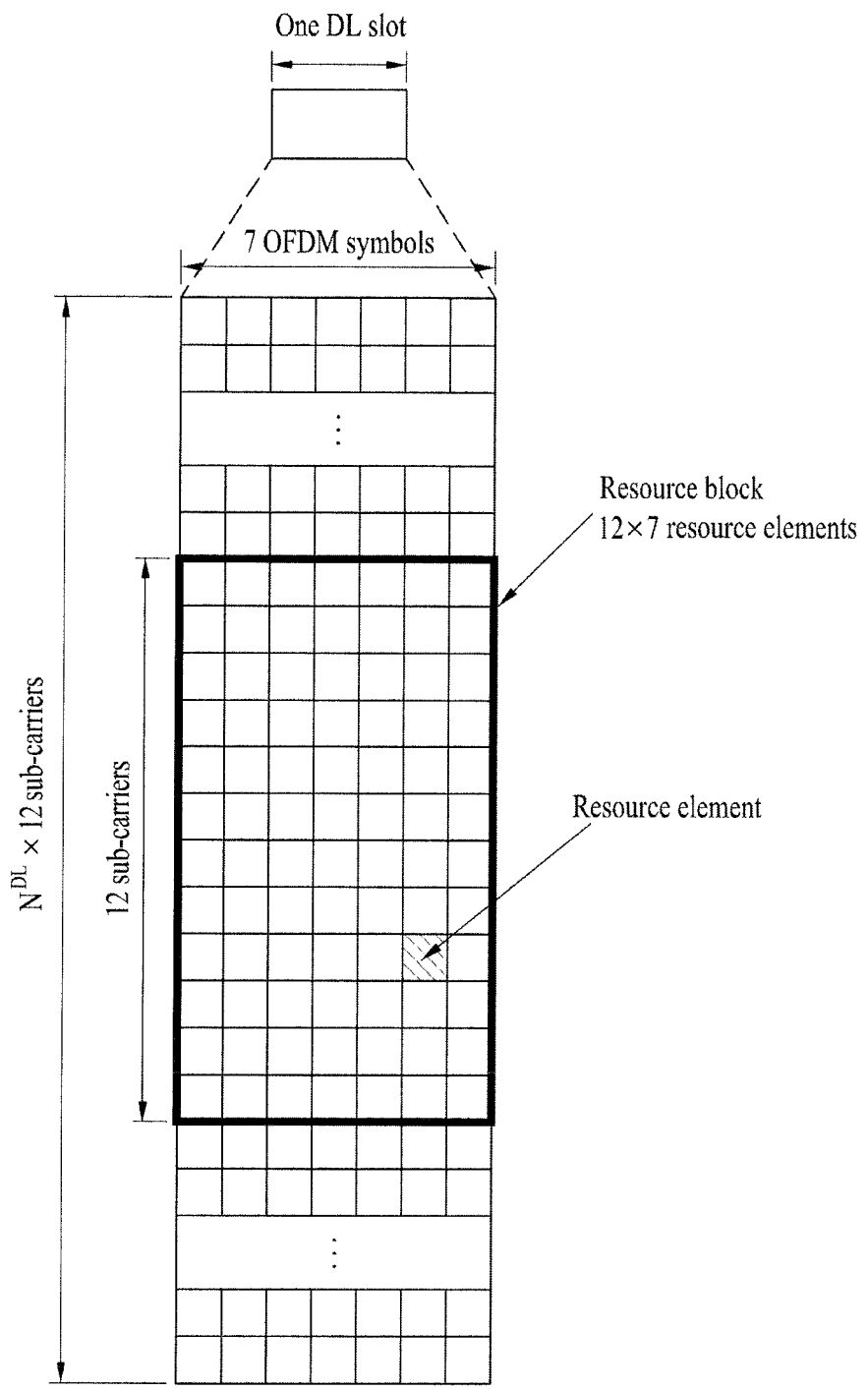
FIG. 2 exemplarily shows a resource grid of one downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
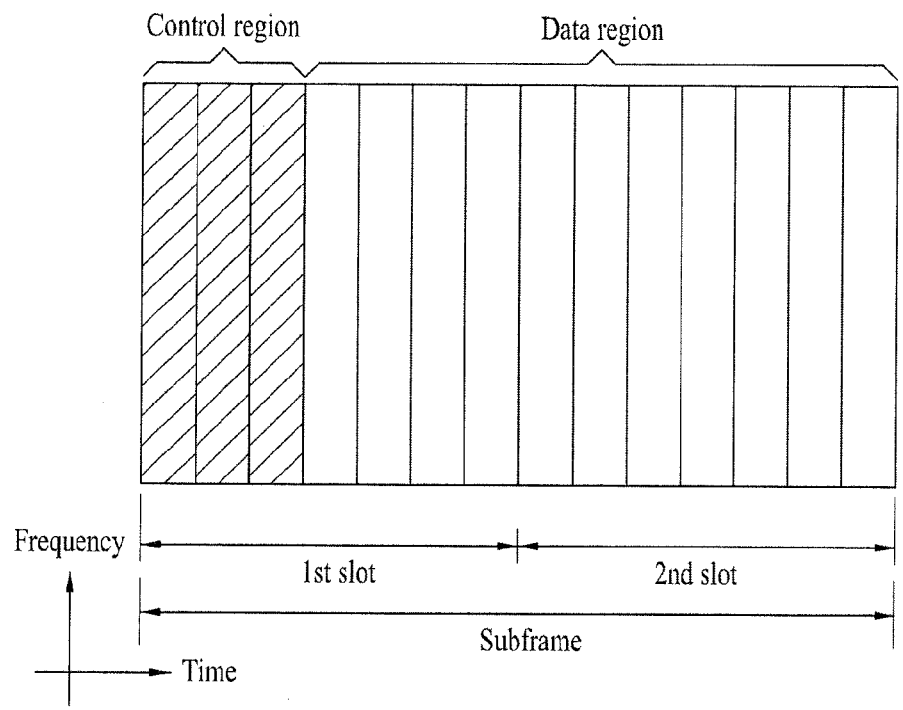
FIG. 3 exemplarily shows a downlink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc.

PCFICH is transmitted at a first OFDM symbol of a subframe, and includes information about the number of OFDM symbols used to transmit the control channel in the subframe.

PHICH includes a HARQ ACK/NACK signal as a response to uplink transmission.

The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. PDCCHs are transmitted as an aggregate of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
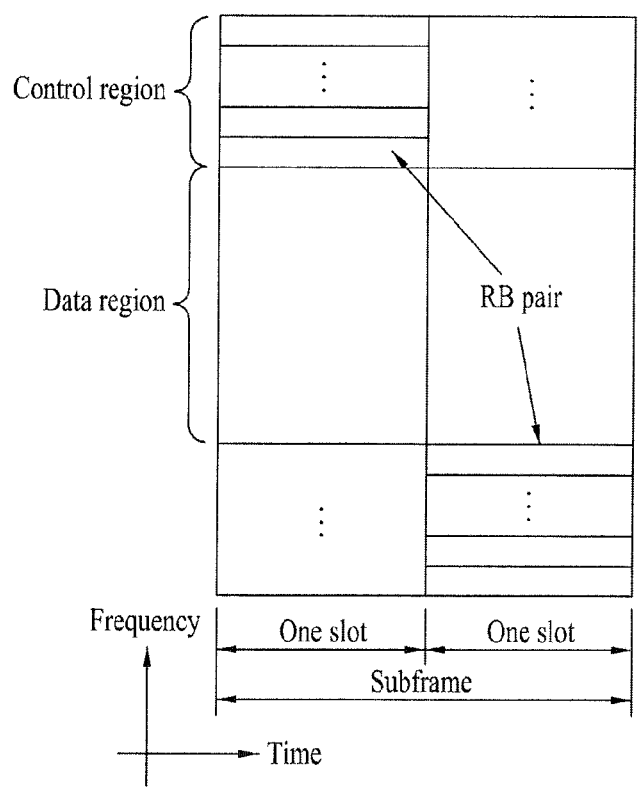
FIG. 4 exemplarily shows an uplink subframe structure.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

DCI Format

DCI formats 0, 1, 1A, 1B, 1C, 1D, 2, 2A, 2B, 2C, 3, 3A and 4 are defined in LTE-A (release 10). DCI formats 0, 1A, 3 and 3A have the same message size to reduce the number of blind decoding operations, which will be described later. The DCI formats may be divided into i) DCI formats 0 and 4 used for uplink scheduling grant, ii) DCI formats 1, 1A, 1B, 1C, 2, 2A, 2B and 2C used for downlink scheduling allocation, and iii) DCI formats 3 and 3A for power control commands according to purpose of control information to be transmitted.

DCI format 0 used for uplink scheduling grant may include a carrier indicator necessary for carrier aggregation which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission with respect to an HARQ process, a transmit power control (TPC) command for a scheduled PUSCH, information on a cyclic shift for a demodulation reference signal (DMRS) and OCC index, and an uplink index and channel quality indicator request necessary for a TDD operation, etc. DCI format 0 does not include a redundancy version, differently from DCI formats relating to downlink scheduling allocation, because DCI format 0 uses synchronous HARQ. The carrier offset is not included in DCI formats when cross-carrier scheduling is not used.

DCI format 4 is newly added to DCI formats in LTE-A release 10 and supports application of spatial multiplexing to uplink transmission in LTE-A. DCI format 4 has a larger message size because it further includes information for spatial multiplexing. DCI format 4 includes additional control information in addition to control information included in DCI format 0. DCI format 4 includes information on a modulation and coding scheme for the second transmission block, precoding information for multi-antenna transmission, and sounding reference signal (SRS) request information. DCI format 4 does not include the offset for format 0/format 1A differentiation because it has a size larger than DCI format 0.

DCI formats 1, 1A, 1B, 1C, 1D, 2, 2A, 2B and 2C for downlink scheduling allocation may be divided into DCI formats 1, 1A, 1B, 1C and 1D that do not support spatial multiplexing and DCI formats 2, 2A, 2B and 2C that support spatial multiplexing.

DCI format 1C supports only frequency contiguous allocation as compact frequency allocation and does not include the carrier indicator and redundancy version, compared to other formats.

DCI format 1A is for downlink scheduling and random access procedure. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission with respect to a HARQ process, a TPC command for a PUCCH, an uplink index necessary for a TDD operation, etc.

DCI format 1 includes control information similar to that of DCI format 1A. DCI format 1 supports non-contiguous resource allocation whereas DCI format 1A supports contiguous resource allocation. Accordingly, DCI format 1 further includes a resource allocation header, and thus slightly increases control signaling overhead as a trade-off for an increase in resource allocation flexibility.

Both DCI formats 1B and 1D further include precoding information, compared to DCI format 1. DCI format 1B includes PMI acknowledgement and DCI format 1D includes downlink power offset information. Most control information included in DCI formats 1B and ID corresponds to that of DCI format 1A.

DCI formats 2, 2A, 2B and 2C include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C may be regarded as an extended version of DCI format 2B and supports spatial multiplexing for up to 8 layers.

DCI formats 3 and 3A may be used to complement the TPC information included in the aforementioned DCI formats for uplink scheduling grant and downlink scheduling allocation, that is, to support semi-persistent scheduling. A 1-bit command is used per UE in the case of DCI format 3 whereas a 2-bit command is used per UE in the case of DCI format 3A.

One of the above-mentioned DCI formats is transmitted through a PDCCH, and a plurality of PDCCHs may be transmitted in a control region. A UE can monitor the plurality of PDCCHs.

Downlink Control Channel Structure

The first three OFDM symbols for each subframe can be basically used as a transmission region of a downlink control channel, and the first to third OFDM symbols may be used according to overhead of a downlink control channel. PCFICH may be used to adjust the number of OFDM symbols for a downlink control channel per subframe. In order to provide acknowledgement/negative acknowledgment (ACK/NACK) information for uplink transmission on downlink, a Physical Hybrid-automatic repeat request (ARQ) Indicator Channel (PHICH) may be used. In addition, a PDCCH may be used to transmit either control information for downlink data transmission or control information for uplink data transmission.

Figure 5:
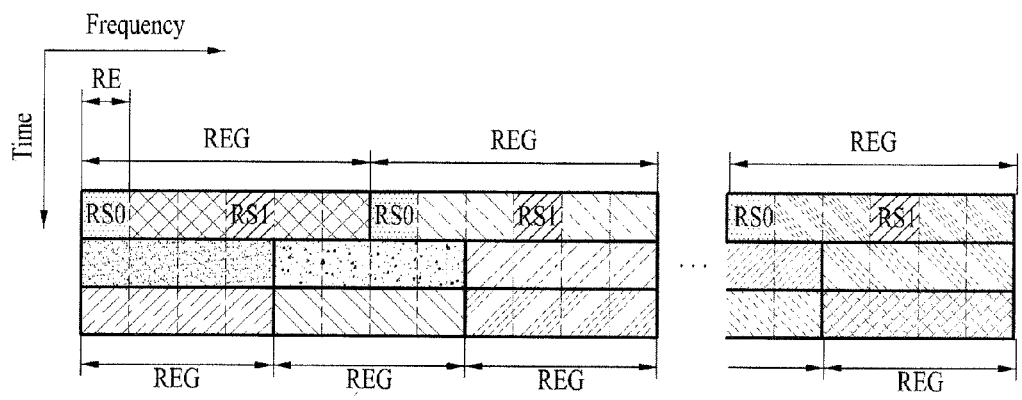
FIGS. 5 and 6 exemplarily show a resource element group (REG) serving as an allocation unit of a downlink control channel.
Figure 6:
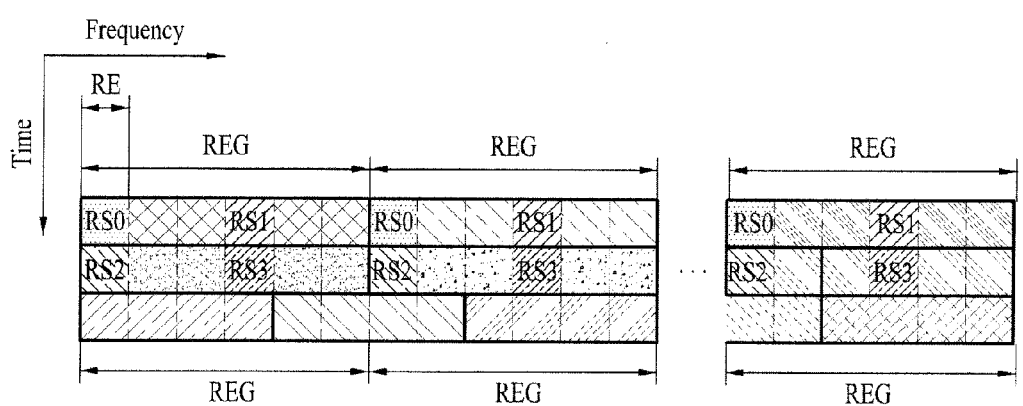

FIGS. 5 and 6 exemplarily show that the above-mentioned downlink control channels are allocated in units of a resource element group (REG) in a control region for each subframe. In more detail, FIG. 5 shows a system having 1 Tx antenna or 2 Tx antennas, and FIG. 6 shows a system having 4 Tx antennas. As can be seen from FIGS. 5 and 6, an REG serving as a basic resource unit to which a control channel is allocated is composed of 4 concatenated resource elements (REs) in a frequency domain other than some REs to which reference signals are allocated. A predetermined number of REGs may be used to transmit a downlink control channel according to downlink control channel (DCH) overhead.

PCFICH (Physical Control Format Indicator Channel)

In order to provide resource allocation information or the like of the corresponding subframe to each subframe, a PDCCH may be transmitted among OFDM symbol indices #0 to #2. In accordance with overhead of a control channel, an OFDM symbol index #0 may be used, OFDM symbol indices #0 and #1 may be used, or OFDM symbol indices #0 to #2 may be used. The number of OFDM symbols used by a control channel may be changed per subframe, and information regarding the number of OFDM symbols may be provided over a PCFICH. Therefore, PCFICH must be transmitted per subframe.

Three kinds of information can be provided through a PCFICH. The following Table 1 shows a Control Format Indicator of a PCFICH. CFI=1 denotes that a PDCCH is transmitted at OFDM symbol index #0, CFI=2 denotes that a PDCCH is transmitted at OFDM symbol indices #0 and #1, and CFI=3 denotes that a PDCCH is transmitted at OFDM symbol indices #0 to #2.

[Table 1]

| CFI | CFI codeword $<b_0, b_1, \ldots, b_{31}>$ |
|---|---|
| 1 | <0,1,1,0,1,1,0,1,1,0,1,1,0,1,1,0,1,1,0,1,1,0,1,1,0,1,1,0,1,1,0,1> |
| 2 | <1,0,1,1,0,1,1,0,1,1,0,1,1,0,1,1,0,1,1,0,1,1,0,1,1,0,1,1,0,1,1,0> |
| 3 | <1,1,0,1,1,0,1,1,0,1,1,0,1,1,0,1,1,0,1,1,0,1,1,0,1,1,0,1,1,0,1,1> |
| 4 (Reserved) | <0,0,0,0,0,0,0,0,0,0,0,0,0,0,0,0,0,0,0,0,0,0,0,0,0,0,0,0,0,0,0,0> |

Information transmitted over a PCFICH may be differently defined according to system bandwidth. For example, if a system bandwidth is less than a specific threshold value, CFI=1, CFI=2, and CFI=3 may indicate that two OFDM symbols, three OFDM symbols, and four OFDM symbols are used for a PDCCH, respectively.

Figure 7:
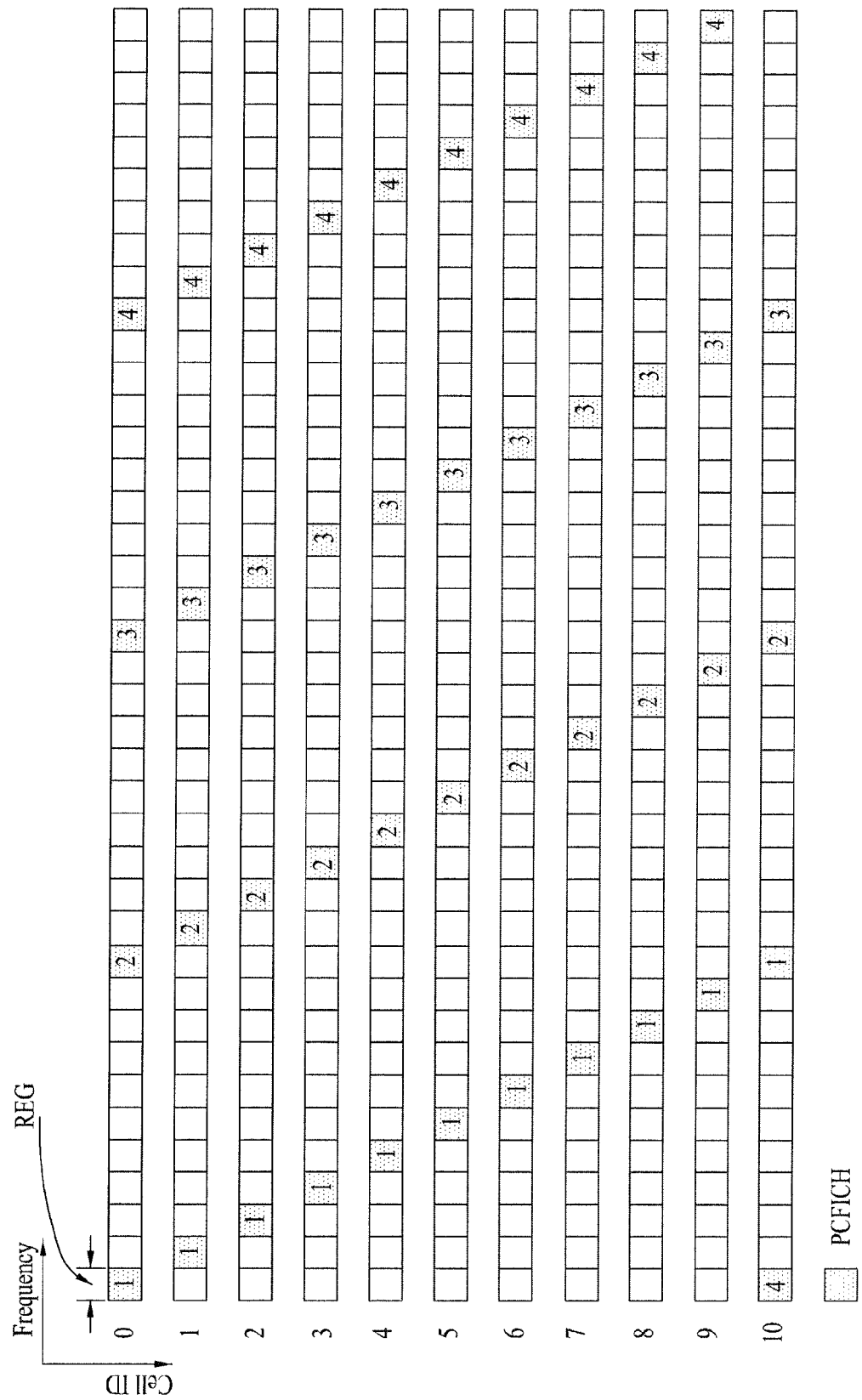
FIG. 7 is a conceptual diagram illustrating a Physical Control Format Indicator Channel (PCFICH) transmission scheme.

FIG. 7 is a conceptual diagram illustrating a PCFICH transmission scheme. An REG shown in FIG. 7 may be composed of 4 subcarriers, and may be composed only of data subcarriers other than a reference signal (RS). Generally, a transmit diversity scheme may be applied to the REG. To prevent inter-cell interference of the PCFICH, the REGs to which the PCFICH is mapped may be shifted per cell in the frequency domain (according to a cell ID). The PCFICH is transmitted at the first OFDM symbol of a subframe all the time. Accordingly, when receiving a subframe, the receiver first confirms PCFICH information, and recognizes the number of OFDM symbols needed for PDCCH transmission, such that it can receive control information transmitted over a PDCCH.

Physical Hybrid-ARQ Indicator Channel (PHICH)

Figure 8:
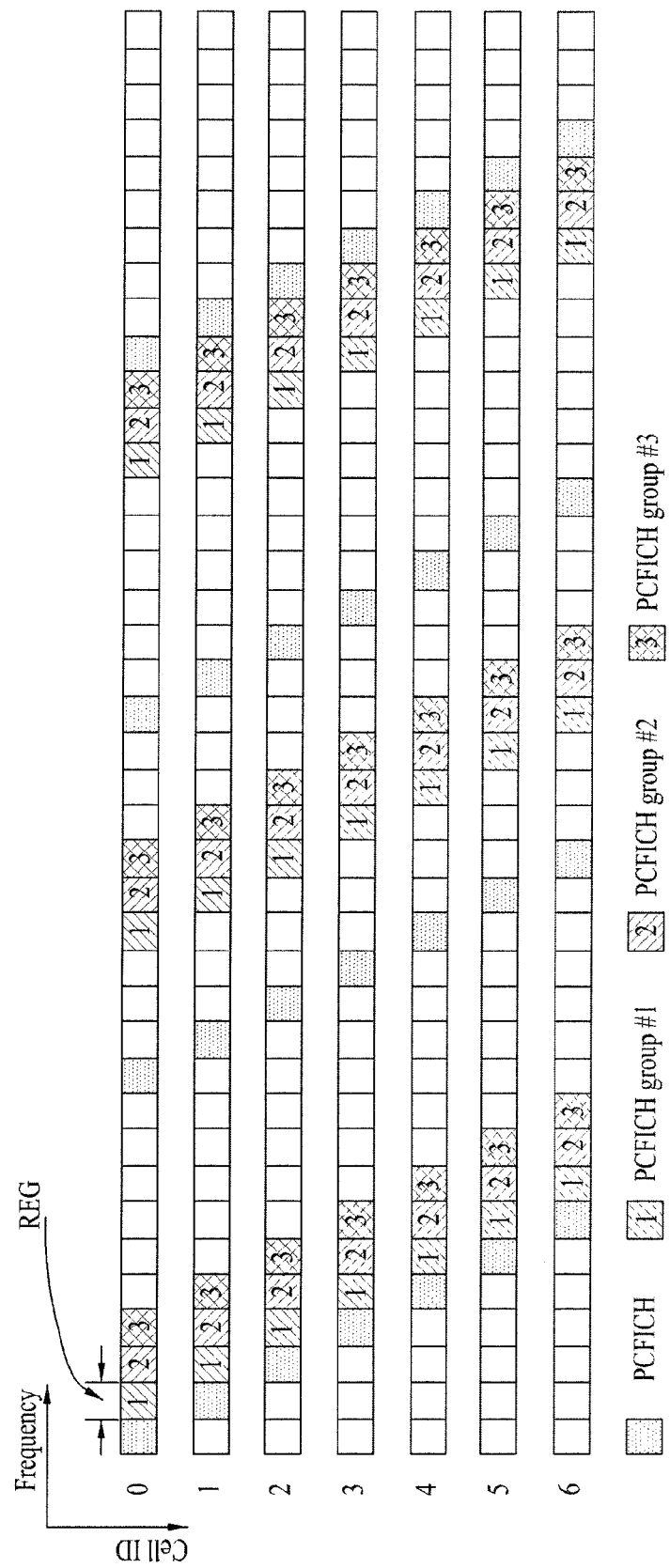
FIG. 8 shows the positions of a PCFICH and a Physical hybrid ARQ indicator Channel (PHICH).

FIG. 8 shows the positions of PCFICH and PHICH generally applied to a specific bandwidth. ACK/NACK information for uplink data transmission is transmitted over a PHICH. A plurality of PHICH groups is constructed in a single subframe, and a plurality of PHICHs may be present in a single PHICH group. Therefore, PHICH channels for multiple UEs are contained in a single PHICH group.

Referring to FIG. 8, allocating a PHICH to each UE of a plurality of PHICH groups is achieved not only using a lowest physical resource block (PRB) index of a PUSCH resource allocation but also a cyclic shift (CS) index for a demodulation RS (DMRS) transmitted on a UL grant PDCCH. DMRS is an uplink reference signal, and is provided along with UL transmission so as to perform channel estimation for demodulating UL data. In addition, a PHICH resource is signaled as an index pair such as $(n_{PHICH}^{group}, n_{PHICH}^{seq})$. In the index pair $(n_{PHICH}^{group}, n_{PHICH}^{seq})$, $n_{PHICH}^{group}$ denotes a PHICH group number and $n_{PHICH}^{seq}$ denotes an orthogonal sequence index in the corresponding PHICH group. $n_{PHICH}^{group}$ and $n_{PHICH}^{seq}$ are defined as shown in the following equation 1.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

[Equation 1]

In Equation 1, $n_{DMRS}$ denotes a cyclic shift of a DMRS used for uplink transmission related to a PHICH, and is mapped to a value of 'cycle shift for DMRS' field of the latest UL grant control information (e.g., DCI format 0 or 4) for a transport block (TB) associated with the corresponding PUSCH transmission. For example, the 'cyclic shift for DMRS' field of the latest UL grant DCI format may be 3 bits long. If the 'cyclic shift for DMRS' field is set to "000", $n_{DMRS}$ may be set to zero '0'.

In Equation 1, $N_{SF}^{PHICH}$ denotes the size of a spreading factor used for PHICH modulation. $I_{PRB\_RA}^{lowest\_index}$ is the lowest PRB index of a first slot of the corresponding PUSCH transmission. $I_{PHICH}$ is set to the value of 1 only when the TDD system is in a special case (if UL/DL configuration is set to zero '0' and PUSCH transmission is achieved at subframe n=4 or n=9, and $I_{PHICH}$ is set to zero '0' in the remaining cases other than the special case. $N_{PHICH}^{group}$ denotes the number of PHICH groups configured by a higher layer. $N_{PHICH}^{group}$ can be obtained using the following equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

[Equation 2]

In Equation 2, $N_g$ denotes information regarding the amount of PHICH resources transmitted on a physical broadcast channel (PBCH), and $N_g$ is 2 bits long and is denoted by $N_g \in \{1/6, 1/2, 1, 2\}$. In Equation 2, $N_{RB}^{DL}$ denotes the number of resource blocks (RBs) configured in downlink.

In addition, examples of orthogonal sequences defined in the legacy 3GPP LTE Release 8/9 are shown in the following table 2.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 9:
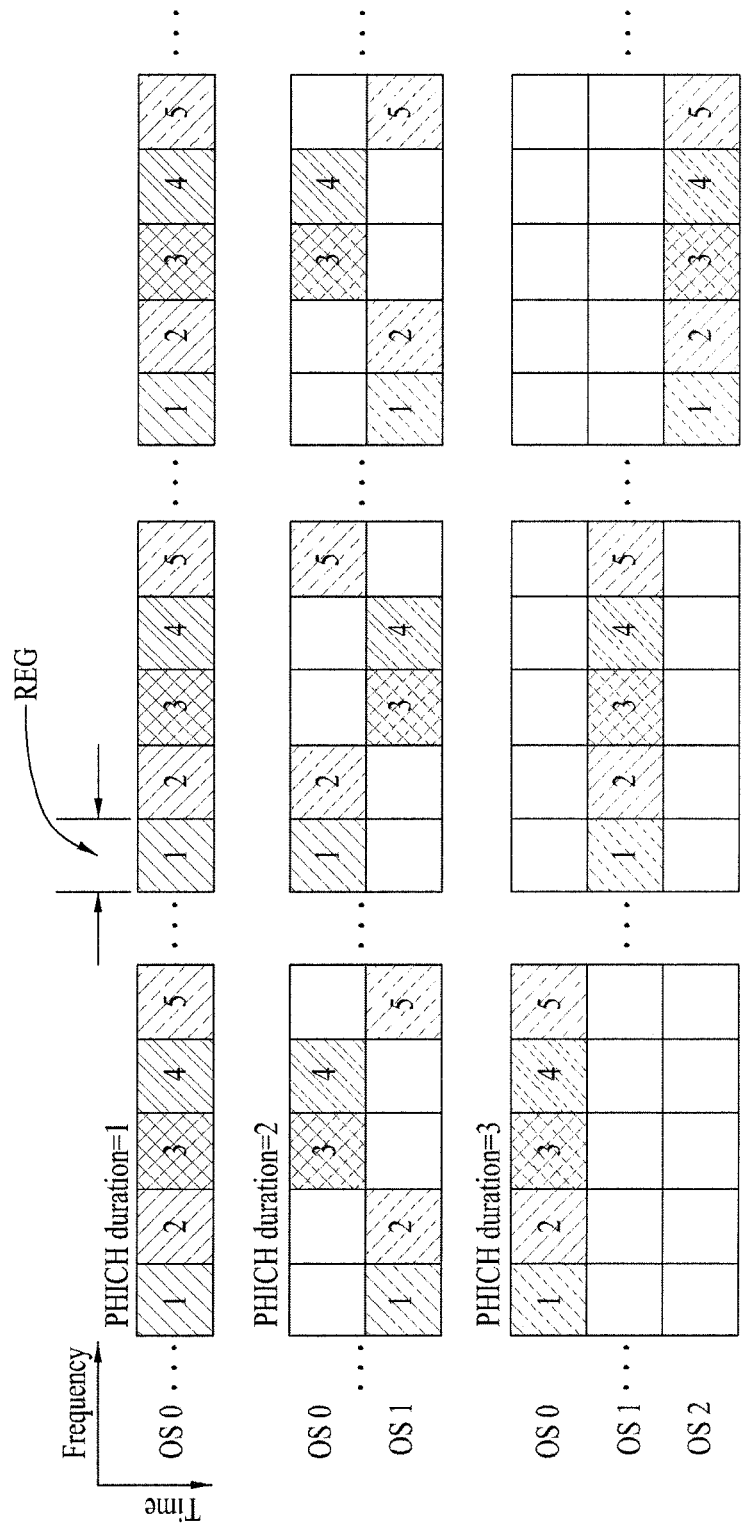
FIG. 9 shows a downlink resource element position mapped to a PHICH group.

FIG. 9 shows a downlink resource element position mapped to a PHICH group. A PHICH group may be constructed in different time domains (i.e., different OFDM Symbols (OSs)) of a single subframe shown in FIG. 9 according to PHICH duration.

PDCCH Processing

When PDCCHs are mapped to REs, control channel elements (CCEs) corresponding to contiguous logical allocation units are used. A CCE includes a plurality of (e.g. 9) REGs and an REG includes 4 neighboring REs except for a reference signal (RS).

The number of CCEs necessary for a specific PDCCH depends on a DCI payload corresponding to control information size, cell bandwidth, channel coding rate, etc. Specifically, the number of CCEs for a specific PDCCH can be determined based on PDCCH format shown in Table 3.

TABLE 3

| PDCCH format | Number of CCEs | Number of REGs | Number of PDCCH bits |
|---|---|---|---|
| 0 | 1 | 9 | 72 |
| 1 | 2 | 18 | 144 |

TABLE 3-continued

| PDCCH format | Number of CCEs | Number of REGs | Number of PDCCH bits |
|---|---|---|---|
| 2 | 4 | 36 | 288 |
| 3 | 8 | 72 | 576 |

While one of the above-mentioned four PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 4.

TABLE 4

| | Search space | | The number of |
|---|---|---|---|
| | Aggregation level | Size (CCE unit) | PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 4, the UE has a plurality of search spaces at each aggregation level because 4 aggregation levels are present. The search spaces may be divided into a UE-specific search space (USS) and a common search space (CSS), as shown in Table 4. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

The search space may be decided by the following equation 3.

$$L \cdot \{(Y_k + m') \bmod \lfloor N_{CCE,k}/L \rfloor\} + i \quad \text{[Equation 3]}$$

In Equation 3, L is an aggregation level, $Y_k$ is a variable decided by RNTI and subframe number (k), m' is the number of PDCCH candidates. If carrier aggregation (CA) is used, m' is denoted by $m' = M^{(L)} \cdot n_{CI}$. If CA is not used, m' is denoted by $m' = m$, where $m = 0, \ldots M^{(L)} - 1$. $M^{(L)}$ is the number of PDCCH candidates. $N_{CCE,k}$ is a total number of CCEs of a control region at the k-th subframe. i is an index for determination of a separate CCE in each PDCCH candidate in the PDCCH and satisfies $i = 0, \ldots L-1$. In a common search space, $Y_k$ is always set to zero '0'.

Figure 10:
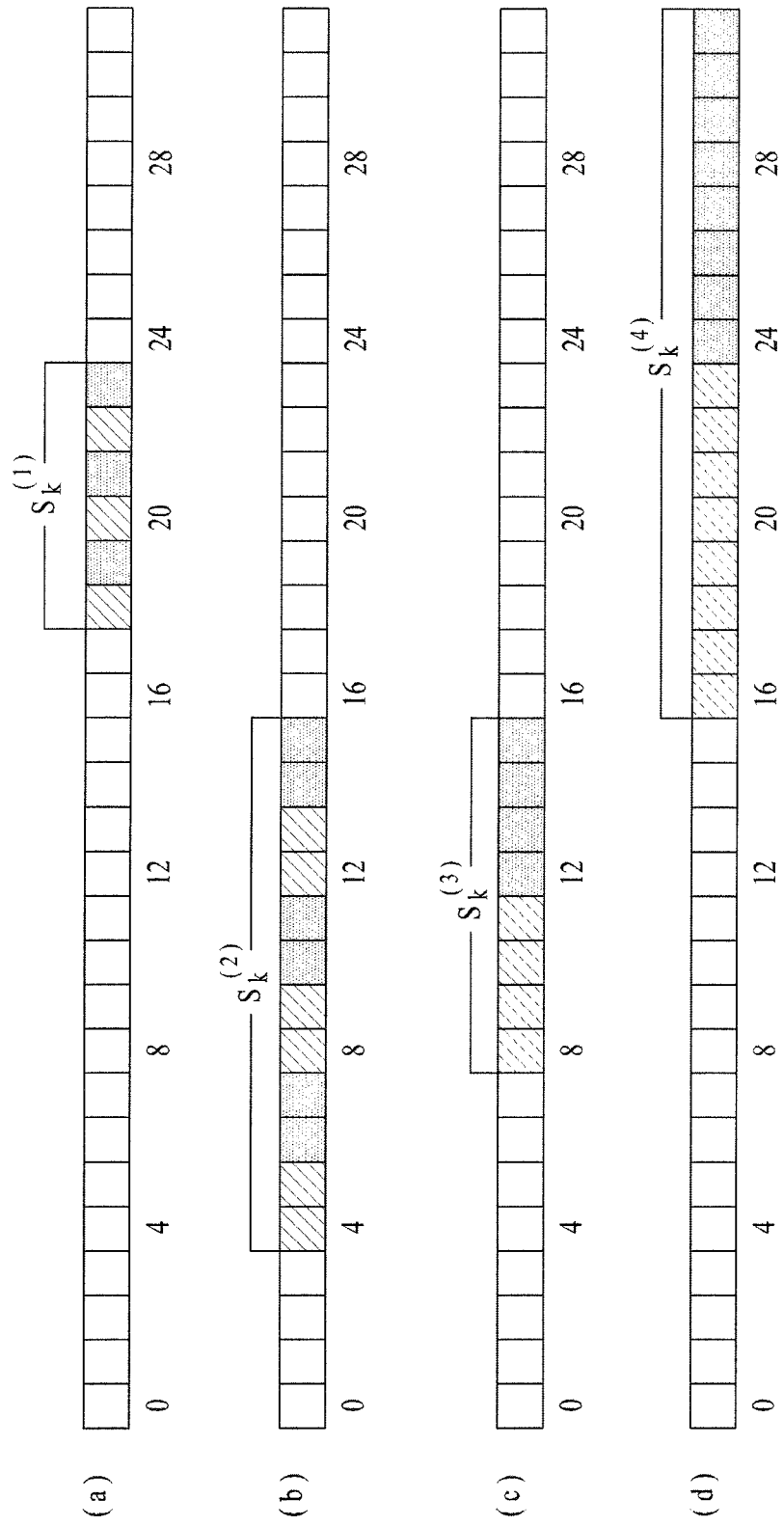
FIG. 10 is a conceptual diagram illustrating a search space at each aggregation level.

FIG. 10 is a conceptual diagram illustrating a UE-specific search space (shaded part) in each aggregation level defined by Equation 3. In FIG. 10, it should be noted that carrier aggregation (CA) is not used and the number of $N_{CCE,k}$ is exemplarily set to 32.

FIGS. 10(a), 10(b), 10(c), and 10(d) show a case of an aggregation level '1', a case of an aggregation level '2', a case of an aggregation level '4', and a case of an aggregation level '8', respectively. In FIG. 10, a start CCE of a search space in each aggregation level is determined to be an RNTI and subframe number (k), and may have different values according to individual aggregation levels due to a modulo function and an aggregation level (L) within the same subframe for one UE. The start CCE may always be set only to a multiple of an aggregation level due to the aggregation level (L). In this case, it is premised that $Y_k$ is set to, for example, a CCE number #18. The UE attempts to sequentially perform decoding from the beginning of a start CCE in units of CCEs decided by the corresponding aggregation level. For example, as can be seen from FIG. 10(b), the UE attempts to perform decoding on the basis of two CCEs according to an aggregation level from the beginning of a CCE number #4 acting as a start CCE.

The UE attempts to decode a search space, as described above. The number of decoding attempts is determined by DCI format and transmission mode determined through RRC signaling. When carrier aggregation (CA) is not applied, the UE needs to perform a maximum of 12 decoding attempts because 2 DCI sizes (DCI format 0/1A/3/3A and DCI format 1C) have to be considered for each of 6 PDCCH candidates for a common search space. For a UE-specific search space, 2 DCI sizes are considered for (6+6+2+2=16) PDCCH candidates and thus a maximum of 32 decoding attempts is needed. Accordingly, a maximum of 44 decoding attempts needs to be performed when carrier aggregation (CA) is not applied.

On the other hand, if carrier aggregation (CA) is used, as many UE-specific search space as the number of DL resources (component carriers: CCs) and a decoding process for DCI format 4 are further added, such that a maximum number of decoding times can be increased indefinitely.

All UEs for use in the above-mentioned legacy LTE/LTE-A system have disclosed DCI on the basis of PDCCH transmitted on resources indicated by PCFICH, a method for allocating a new structure and a new PDCCH operating in a transmission mode to a PDSCH region in consideration of not only various cell deployment scenarios such as RRH (Remote Radio Head) but also MIMO (Multiple Input Multiple Output) such as feedback-based closed-loop beamforming of a UE has been intensively discussed in LTE Release 11 and up. A newly defined PDCCH will hereinafter be referred to as E-PDCCH, and a conventional PDCCH will hereinafter be referred to as a legacy PDCCH.

The present invention defines a method for configuring a primary PDCCH for a user equipment (UE) of LTE Release 11 or higher in a cell in which a legacy PDCCH and an E-PDCCH coexist, and a method for performing blind decoding of a UE. Specifically, if a primary PDCCH of a UE is configured or reconfigured through RRC signalling, during a predetermined time from a start time at which RRC signalling (E-PDCCH configuration or PDCCH configuration) for the corresponding primary PDCCH configuration is transferred from the BS or eNB to an end time at which the UE and BS completely perform transmission and reception according to the changed PDCCH configuration, there may occur an ambiguity section in the predetermined time. For example, if the UE and BS perform transmission and reception using a legacy PDCCH and attempt to use E-PDCCH from a certain time, the BS transmits E-PDCCH configuration information. A time period ranging from the transmission time of the E-PDCCH configuration information to a transmission time of an associated acknowledgement (ACK) response may be contained in an ambiguity section, because the UE may incorrectly receive E-PDCCH configuration information. In addition, after the UE transmits an ACK message to the E-PDCCH configuration information, the BS may incorrectly receive this ACK/NACK response, such that there may be an ambiguity section corresponding to a predetermined time. In brief, the ambiguity section is a predetermined time in which the BS and UE can finish switching of a primary PDCCH changed through RRC signalling or the like. During the ambiguity section, blind decoding is performed on a resource region of a primary PDCCH (in the above example, PDCCH) before the UE is changed to another UE on the condition that the BS transmits DCI through the changed primary PDCCH (in the above example, E-PDCCH), such that mismatch between DCI transmission of the BS and DCI reception of the UE may occur in the ambiguity section.

The following description will disclose a method for enabling a UE to perform blind decoding during the ambiguity section. The blind decoding mode caused by E-PDCCH introduction will hereinafter be described, and UE operations to be performed in the ambiguity section will also be described in detail.

Definition of Blind Decoding Mode Based on E-PDCCH Introduction

First, a first blind decoding mode is a blind decoding (BD) operation mode in which PDCCH reception is performed by a UE in which a legacy PDCCH is configured as a primary DL control channel.

That is, during the first blind decoding mode, the UE may receive a DCI through the legacy PDCCH on all non-DRS (Discontinuous Reception) DL subframes. Therefore, the UE may perform blind decoding in the legacy PDCCH CSS region and the USS region defined in LTE/LTE-A. However, the blind decoding procedure performed by the UE in CSS and USS of the legacy PDCCH may perform the blind decoding procedure of CSS and USS defined for Release-11 UE. In other words, if DCI format in which blind decoding must be performed in the CSS and USS regions, and RNTI scrambled with a CRC are newly defined, the UE may operate according to this new definition.

Second, a second blind decoding mode is a blind decoding operation mode in which a UE in which E-PDCCH is configured as a primary downlink control channel performs PDCCH reception.

In a second blind decoding mode, the UE may receive DCI only through E-PDCCH on all non-DRX downlink subframes. The UE may perform blind decoding in the E-PDCCH CSS and USS regions according to E-PDCCH configuration information for the corresponding UE. However, in the same manner as in the first blind decoding mode, the blind decoding procedure performed by the UE in the CSS and USS regions of E-PDCCH may follow the blind decoding procedure in the CSS and USS regions defined for Release-11 UE.

Third, a third blind decoding mode is a UE blind decoding operation mode contained in the above-mentioned ambiguity section (i.e., a first ambiguity section). In more detail, if a primary downlink control channel of a UE, that operates in a first blind decoding mode after a legacy PDCCH is configured as a primary PDCCH, is changed to an E-PDCCH, until a second blind decoding mode operates after the corresponding configuration change is completely applied from a specific time at which RRC signalling of the corresponding configuration change is transferred from the BS to the UE, a predetermined ambiguity section occurs. That is, the UE blind decoding operation mode in the first ambiguity section is defined as a third blind decoding mode. The UE operations in the second blind decoding mode may be defined as shown in the following two examples.

A UE for use in the third blind decoding mode may perform blind decoding not only in the CSS region of the legacy PDCCH but also in the USS region of the E-PDCCH on all non-DRX downlink subframes. Alternatively, the UE of the third blind decoding mode may be configured to perform blind decoding not only in the CSS region of the legacy PDCCH but also in the CSS region of E-PDCCH on all non-DRX downlink subframes.

In each case, the blind decoding procedure in the CSS region of the legacy PDCCH and the USS region of E-PDCCH may be newly defined for Release-11 UE, or may follow the blind decoding procedure in the legacy LTE/LTE-A system. In other words, if not only a DCI format in which the UE must perform blind decoding, but also an RNTI scrambled with CRC may follow the UE blind decoding operation newly defined in the CSS and USS regions defined for Release-11 UE, the UE may satisfy the DCI format and the RNTI, or if the Release-11 UE performs the same UE blind decoding procedure as in the CSS and USS regions of the legacy LTE/LTE-A systems, the Release-11 UE may also perform blind decoding within the corresponding region.

A fourth blind decoding mode is an ambiguity section corresponding to an opposite case of the third blind decoding mode. The fourth blind decoding mode is an ambiguity section generated when E-PDCCH is changed to the legacy PDCCH. That is, the fourth blind decoding mode is a UE blind decoding mode of the second ambiguity section. The second ambiguity section starts from a specific time at which RRC signalling of the corresponding configuration change is transferred from the BS to the UE, and is ended at a specific time at which the corresponding configuration change is completely applied and the second blind decoding mode starts operation.

A UE of the fourth blind decoding mode may perform blind decoding not only in the CSS region of E-PDCCH but also in the USS region of the legacy PDCCH on all non-DRX DL subframes. Alternatively, only blind decoding may be configured not only in the CSS region of the legacy PDCCH but also in the CS region of E-PDCCH.

In each case, the blind decoding procedure in the CSS region of the legacy PDCCH and the blind decoding procedure in the USS region of E-PDCCH may be newly defined for Release-11 UE, or may be based on blind decoding of the legacy LTE/LTE-A. In other words, DCI format in which the UE must perform blind decoding and RNTI scrambled with CRC may be based on the UE blind decoding operation newly defined in the CSS and USS regions defined for Release-11 UE. Alternatively, the Release-11 UE may perform blind decoding in the corresponding region when the same UE blind decoding procedure is performed in the CSS and USS regions of the legacy LTE/LTE-A systems.

Detailed operations in the first and second ambiguity sections will hereinafter be described on the basis of definition of the above-mentioned blind decoding modes.

First, the first ambiguity section in which the BS and UE operate in the first blind decoding mode and then completely switch to the second blind decoding mode will hereinafter be described in detail.

Figure 11:
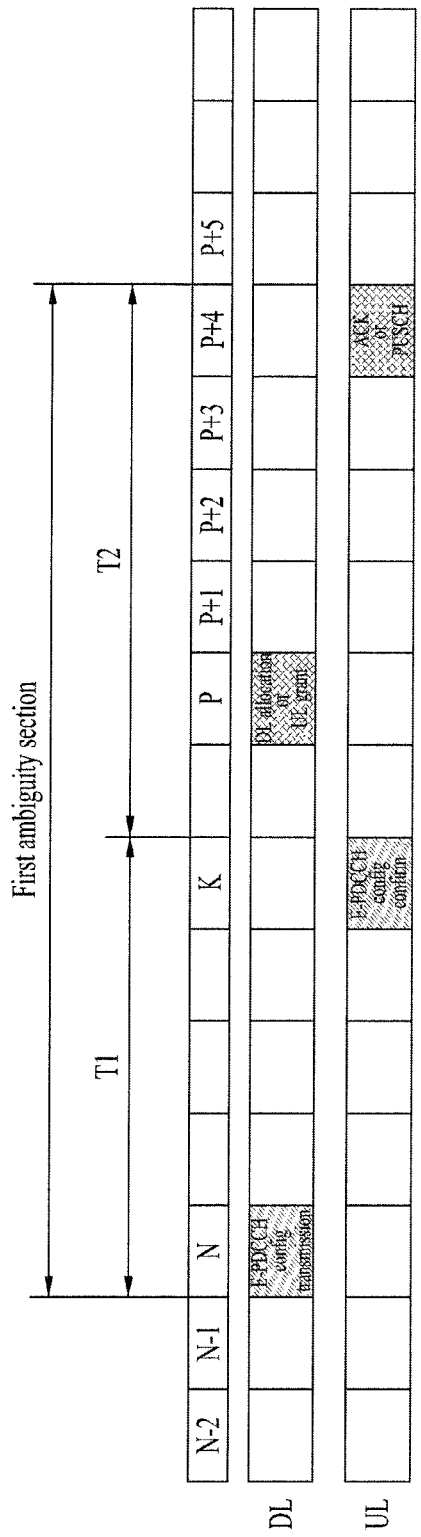
FIG. 11 is a conceptual diagram illustrating blind decoding (BD) according to the embodiments.

An ambiguity section contained in the first ambiguity section may be classified into two sub-ambiguity sections (T1, T2) as shown in FIG. 11.

The BS transmits E-PDCCH configuration information to the UE. In the range from this E-PDCCH configuration information transmission time to a reception time at which the BS receives a higher layer confirm message regarding E-PDCCH configuration information of the corresponding UE, an ambiguity section of the UE blind decoding operation may occur. That is, as shown in FIG. 11, the range from DL subframe N at which a first E-PDCCH configuration is transmitted to UL subframe K at which an ACK message to the E-PDCCH configuration is received from the UE through a PUSCH is referred to as a first ambiguity section T1. Because it is impossible to recognize whether the UE successfully receives the corresponding E-PDCCH configuration information on the condition that an acknowledgement (ACK) message to the E-PDCCH configuration information is not received, such that the first ambiguity section occurs. As a result, in a DL subframe located after the BS transmits E-PDCCH configuration information, the BS may have ambiguity in determining whether the blind decoding mode of the UE is a first blind decoding mode (in case that reception of the E-PDCCH configuration message is failed) or a third blind decoding mode (in case that the E-PDCCH configuration message is successfully received).

Accordingly, the BS can transmit a DCI for the corresponding UE through a CSS of the legacy PDCCH in the first blind decoding mode and the third blind decoding mode. Here, the CSS is a search space in which the UE commonly performs blind decoding in the first and third blind decoding modes. Thereafter, if the BS receives an ACK message to the E-PDCCH configuration information from the UE at a subframe K, it can be recognized that the blind decoding operation mode of the UE is a third blind decoding mode. Thereafter, in order to control the UE operation mode to switch from the third blind decoding mode to the second blind decoding mode within the second ambiguity section T2, the BS may transmit DCI for the corresponding UE through E-PDCCH USS (or CSS). If the UE operation based on the corresponding DCI is finally confirmed (for example, if PUCCH ACK/NACK for PUSCH transmission according to DL allocation for the corresponding UE) is successful received, if PUSCH transmission from a UE is detected during UL grant transmission, if aperiodic SRS (Sounding Reference Signal) transmission is configured through the corresponding DCI irrespective of a DCI format transmitted through E-PDCCH USS (or CSS), or if SRS is received), this means that the UE is finally switched to the second blind decoding mode, such that the UE can transmit DCI using both E-PDCCH CSS and E-PDCCH USS from a subsequent DL subframe.

If the UE successfully receives E-PDCCH configuration information from the BS through the DL subframe N, the first blind decoding mode can be switched to the third blind decoding mode in the range ranging from a subframe N+5 subsequent to a UL subframe N+4 at which ACK/NACK acting as a response to the E-PDCCH configuration information is transmitted. However, if the TDD system receives the E-PDCCH configuration information through the DL subframe N, the first blind decoding mode can be switched to the third blind decoding mode in the range from the first DL subframe located after a UL subframe N+i at which an ACK message acting as a response to the E-PDCCH configuration information is transmitted. As another method for indicating a switching time at which the first blind decoding is switched to the third blind decoding mode, this switching time may be set to a first DL subframe to be activated after the E-PDCCH configuration information is successfully decoded.

Thereafter, under the condition that DCI received through E-PDCCH USS (or CSS) is DL allocation or UL grant, the UE operating in the third blind decoding mode may operate in the second blind decoding mode from the first DL subframe (P+5) located after a UL subframe (P+4) in which PUCCH ACK/NACK or PUSCH transmission is achieved. The TDD system may operate in the second blind decoding mode in the range from the next subframe of a subframe in which UL transmission (PUCCH ACK/NACK of PDSCH in case of DL grant, PUSCH transmission in case of UL grant, or aperiodic SRS transmission) corresponding to DCI transmission of the DL sufbrame P is present.

As another example in which the third blind decoding mode is switched to the second blind decoding mode, if the UE initially receives DCI from the BS through the E-PDCCH region (USS or CSS), the UE may switch to the second blind decoding mode from the next DL subframe. That is, if the UE initially receives DCI through the E-PDCCH region at a DL subframe P, the UE may switch to the second blind decoding mode from the DL subframe (P+1) (i.e., from a first DL subframe located after DL subframe P in case of TDD).

The second ambiguity section is an ambiguity section generated when the second blind decoding mode is switched to the first blind decoding mode. In the second ambiguity section, the BS may transmit the legacy PDCCH configuration information to the UE. In the range from the transmission time of the legacy PDCCH configuration information to a reception time of a higher layer ACK/NACK response to the legacy PDCCH configuration information of the corresponding UE, a first ambiguity section occurs in the UE blind decoding operation. That is, the first ambiguity section ranges from a DL subframe B at which first legacy PDCCH configuration information is transmitted to a UL subframe K at which an ACK message to the legacy PDCCH configuration information is received from the UE over a PUSCH. The first ambiguity section may occur because it is impossible to recognize whether the UE successfully receives the legacy PDCCH configuration information before reception an ACK message from the UE. As a result, the BS may have ambiguity in recognizing whether the UE blind decoding mode of a DL subframe is set to a second blind decoding mode (in case of a failure in legacy PDCCH configuration message reception) after legacy PDCCH configuration information is transmitted through DL subframe N, or a fourth blind decoding mode (in case of successful reception of legacy PDCCH configuration message). Therefore, the BS may propose a method for transmitting DCI for the corresponding UE through E-PDCCH CSS indicating a search space in which the UE commonly performs blind decoding in the second blind decoding mode and the fourth blind decoding mode. Thereafter, if the BS receives an ACK/NACK response to the legacy PDCCH configuration information from the UE at a UL subframe K, the BS can recognize that the blind decoding operation mode of a current UE is a fourth blind decoding mode. Finally, the BS may transmit a DCI for the corresponding UE through the legacy PDCCH USS (or CSS) so as to switch the UE operation mode from the fourth blind decoding mode to the first blind decoding mode. If the UE operation caused by the corresponding DCI is finally configured (e.g., if PUCCH ACK/NACK for PDSCH transmission according to DL allocation for the corresponding UE is successfully received, or if PUSCH transmission from the corresponding UE is detected during UL grant transmission), this means that the UE is finally switched to the first blind decoding mode, such that DCI can be transmitted using both CSS of the legacy PDCCH and USS of the legacy PDCCH. Alternatively, irrespective of a DCI format transmitted through the legacy PDCCH USS (or CSS), aperiodic SRS transmission configuration is achieved through the corresponding DCI, and the UE transmits SRS on the basis of the aperiodic SRS transmission configuration, such that the BS can recognize that the UE finally switches to the first blind decoding mode.

If the UE successfully receives the legacy PDCCH configuration information from the BS through the DL subframe M, the UE may perform switching from the second blind decoding mode to the fourth blind decoding mode in the range from a DL subframe M+5 subsequent to a UL subframe M+4 in which ACK/NACK to the legacy PDCCH configuration information is transmitted. However, if a TDD system receives legacy PDCCH configuration information through the DL subframe M, the second blind decoding mode is switched to the fourth blind decoding mode in the range from a first DL subframe located after the UL subframe M+i in which UL HARQ ACK/NACK is transmitted. As another method for performing switching from the second blind decoding mode to the fourth blind decoding mode, a first DL subframe located after legacy PDCCH configuration information transmitted through the DL subframe M is successfully decoded may be used.

Thereafter, if the UE operating in the fourth blind decoding mode initially receives DCI from the BS through the legacy PDCCH region, a current mode may switch to the first blind decoding mode in the range from the next DL subframe. That is, if DCI is initially received through the legacy PDCCH region at a DL subframe P, the current mode may switch to the first blind decoding mode in the range from a DL subframe (P+1), or the TDD system may also switch to the first blind decoding mode in the range from the first DL subframe located after a DL subframe P.

In another method, if the corresponding DCI is DL allocation or UL grant, the first blind decoding mode may start from a first DL subframe (P+5) located after a UL subframe (P+4) in which PUCCH ACK/NACK and PUSCH transmission is achieved. Alternatively, the TDD system may operate in the first blind decoding mode in the range from a first DL subframe located after a UL subframe in which UL transmission (PUCCH ACK/NACK of PDSCH in case of DL allocation, PUSCH transmission in case of UL grant, or aperiodic SRS transmission) corresponding to DCI transmission of a DL subframe P is achieved.

Figure 12:
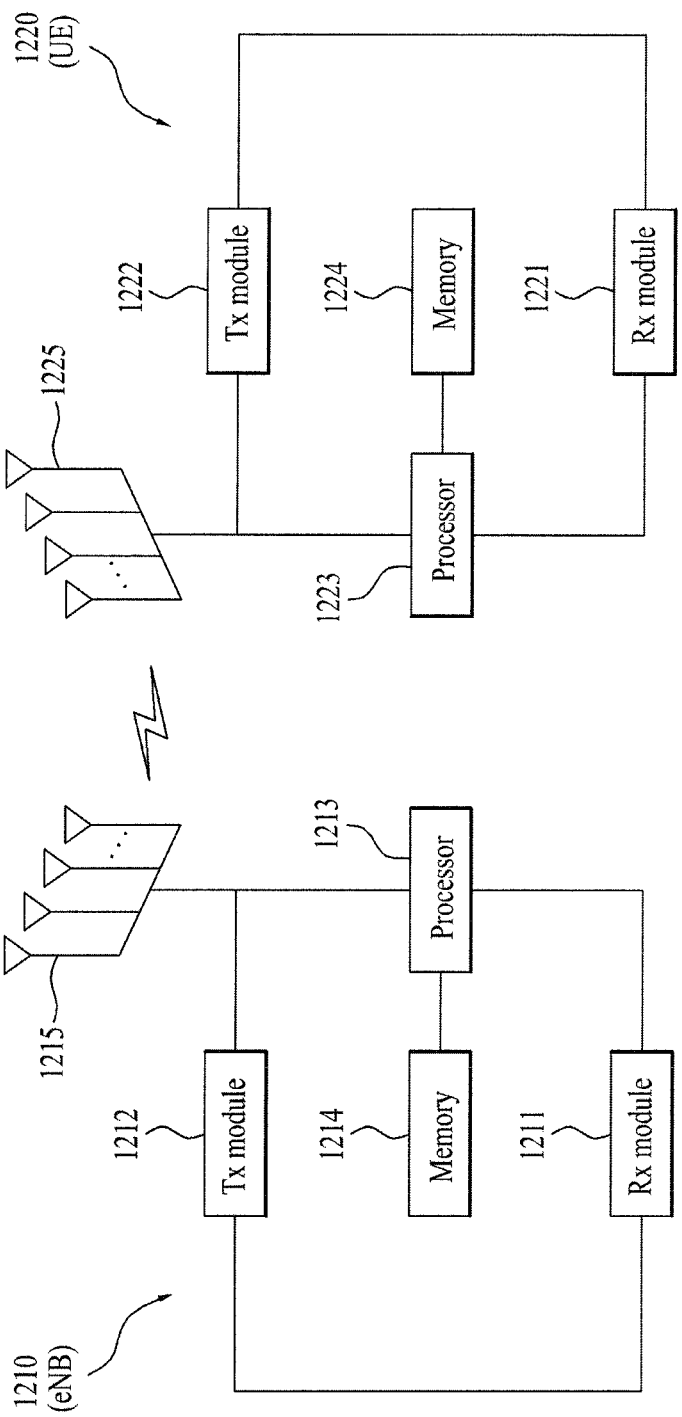
FIG. 12 is a block diagram illustrating a BS (or eNB) device and a UE device according to the embodiments.

FIG. 12 is a block diagram illustrating a BS (eNB) device and a UE device according to the embodiments of the present invention.

Referring to FIG. 12, the BS device 1210 according to the present invention may include a reception (Rx) module 1211, a transmission (Tx) module 1212, a processor 1213, a memory 1214, and a plurality of antennas 1215. The plurality of antennas 1215 indicates the BS device for supporting MIMO transmission and reception. The reception (Rx) module 1211 may receive a variety of signals, data and information on an uplink starting from the UE. The Tx module 1212 may transmit a variety of signals, data and information on a downlink for the UE. The processor 1213 may provide overall control to the BS device 1210. The processor 1213 may be configured to implement the embodiments of the present invention.

The processor 1213 of the BS device 1210 processes information received at the BS device 1210 and transmission information to be transmitted externally. The memory 1214 may store the processed information for a predetermined time. The memory 1214 may be replaced with a component such as a buffer (not shown).

Referring to FIG. 12, the UE device 1220 may include an Rx module 1221, a Tx module 1222, a processor 1223, a memory 1224, and a plurality of antennas 1225. The plurality of antennas 1225 indicates a UE device supporting MIMO transmission and reception. The Rx module 1221 may receive downlink signals, data and information from the BS (eNB). The Tx module 1222 may transmit uplink signals, data and information to the BS (eNB). The processor 1223 may provide overall control to the UE device 1220. The processor 1223 may be configured to implement the embodiments of the present invention.

The processor 1223 of the UE device 1220 processes information received at the UE device 1220 and transmission information to be transmitted externally. The memory 1224 may store the processed information for a predetermined time. The memory 1224 may be replaced with a component such as a buffer (not shown).

The specific configurations of the BS device and the UE device may be implemented such that the various embodiments of the present invention are performed independently or two or more embodiments of the present invention are performed simultaneously. Redundant matters will not be described herein for clarity.

The description of the BS device 1210 shown in FIG. 12 may be applied to a device acting as the DL transmission entity or UL reception entity without departing from the scope or spirit of the present invention. In addition, the description of the UE device 1220 may be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

Although the embodiments of the present invention have been disclosed on the basis of the 3GPP LTE mobile communication system, the embodiments can be equally or equivalently applied to various wireless communication systems.

The invention claimed is:

1. A method for acquiring control information of a user equipment (UE) in a wireless communication system, the method comprising:
receiving Enhanced-Physical Downlink Control Channel (E-PDCCH) configuration information from a base station (BS); and
transmitting an acknowledgement/negative acknowledgment (ACK/NACK) response to the E-PDCCH configuration information,
wherein, during a predetermined time after the transmission of the ACK/NACK response, the user equipment (UE) performs blind decoding for downlink control information (DCI) in a common search space of a physical downlink control channel (PDCCH) resource region and in a search space of an E-PDCCH resource region,
wherein the DCI is received through the search space of the E-PDCCH resource region, and
wherein the predetermined time starts from a next subframe of a subframe in which the ACK/NACK response is transmitted, and ends at a subframe in which a response to the received DCI is transmitted.

2. The method according to claim 1, wherein the user equipment (UE) performs blind decoding only in a UE-specific search space of the PDCCH resource region during a time period ranging from a reception time of the E-PDCCH configuration information to a transmission time of the ACK/NACK response.

3. The method according to claim 1, wherein the user equipment (UE) performs blind decoding for downlink control information (DCI) only in a search space of the E-PDCCH resource region, after predetermined time duration.

4. The method according to claim 1, wherein the search space of the E-PDCCH resource region is any one of a common search space or a UE-specific search space.

5. The method according to claim 1, wherein the E-PDCCH configuration information includes specific information that informs the user equipment (UE) that downlink control information (DCI) will be transferred through the E-PDCCH resource region.

6. A method for transmitting control information of a base station (BS) in a wireless communication system, the method comprising:
transmitting Enhanced-Physical Downlink Control Channel (E-PDCCH) configuration information; and
receiving an acknowledgement/negative acknowledgment (ACK/NACK) response to the E-PDCCH configuration information,
wherein, during a predetermined time after the reception of the ACK/NACK response, the base station (BS) transmits downlink control information (DCI) in a common search space of a physical downlink control channel (PDCCH) resource region and in a search space of an E-PDCCH resource region,
and
wherein the predetermined time starts from a next subframe of a subframe in which the ACK/NACK response is received, and ends at a subframe in which a response to the transmitted DCI is received.

7. A method for acquiring control information of a user equipment (UE) in a wireless communication system, the method comprising:
receiving Enhanced-Physical Downlink Control Channel (E-PDCCH) configuration information from a base station (BS); and
transmitting an acknowledgement/negative acknowledgment (ACK/NACK) response to the E-PDCCH configuration information,
wherein, during a predetermined time after the transmission of the ACK/NACK response, the user equipment (UE) performs blind decoding for downlink control information (DCI) in a common search space of a physical downlink control channel (PDCCH) resource region and in a search space of an E-PDCCH resource region,
wherein the DCI is received through the search space of the PDCCH resource region,
wherein the predetermined time starts from a next subframe of a subframe in which the ACK/NACK response is transmitted, and ends at a subframe in which a response to the received DCI is transmitted.

8. The method according to claim 7, wherein the user equipment (UE) performs blind decoding only in a UE-specific search space of the E-PDCCH resource region during a time period ranging from a reception time of the PDCCH configuration information to a transmission time of the ACK/NACK response.

9. The method according to claim 7, wherein the user equipment (UE) performs blind decoding for downlink control information (DCI) only in a search space of the PDCCH resource region, after predetermined time duration.

10. The method according to claim 7, wherein the search space of the PDCCH resource region is any one of a common search space or a UE-specific search space.

11. The method according to claim 7, wherein the PDCCH configuration information includes specific information that informs the user equipment (UE) that downlink control information (DCI) will be transferred through the PDCCH resource region.

12. A method for transmitting control information of a base station (BS) in a wireless communication system, the method comprising:
transmitting Physical Downlink Control Channel (PDCCH) configuration information; and
receiving an acknowledgement/negative acknowledgment (ACK/NACK) response to the PDCCH configuration information,
wherein, during a predetermined time after the reception of the ACK/NACK response, the base station (BS) transmits downlink control information (DCI) in a common search space of an E-PDCCH resource region and in a search space of a PDCCH resource region,
and
wherein the predetermined time starts from a next subframe of a subframe in which the ACK/NACK response is received, and ends at a subframe in which a response to the transmitted DCI is received.

* * * * *